May 21, 1957
C. H. WALDHAUER, JR
2,793,341
ALTITUDE CONTROL DEVICES
Filed Jan. 10, 1955
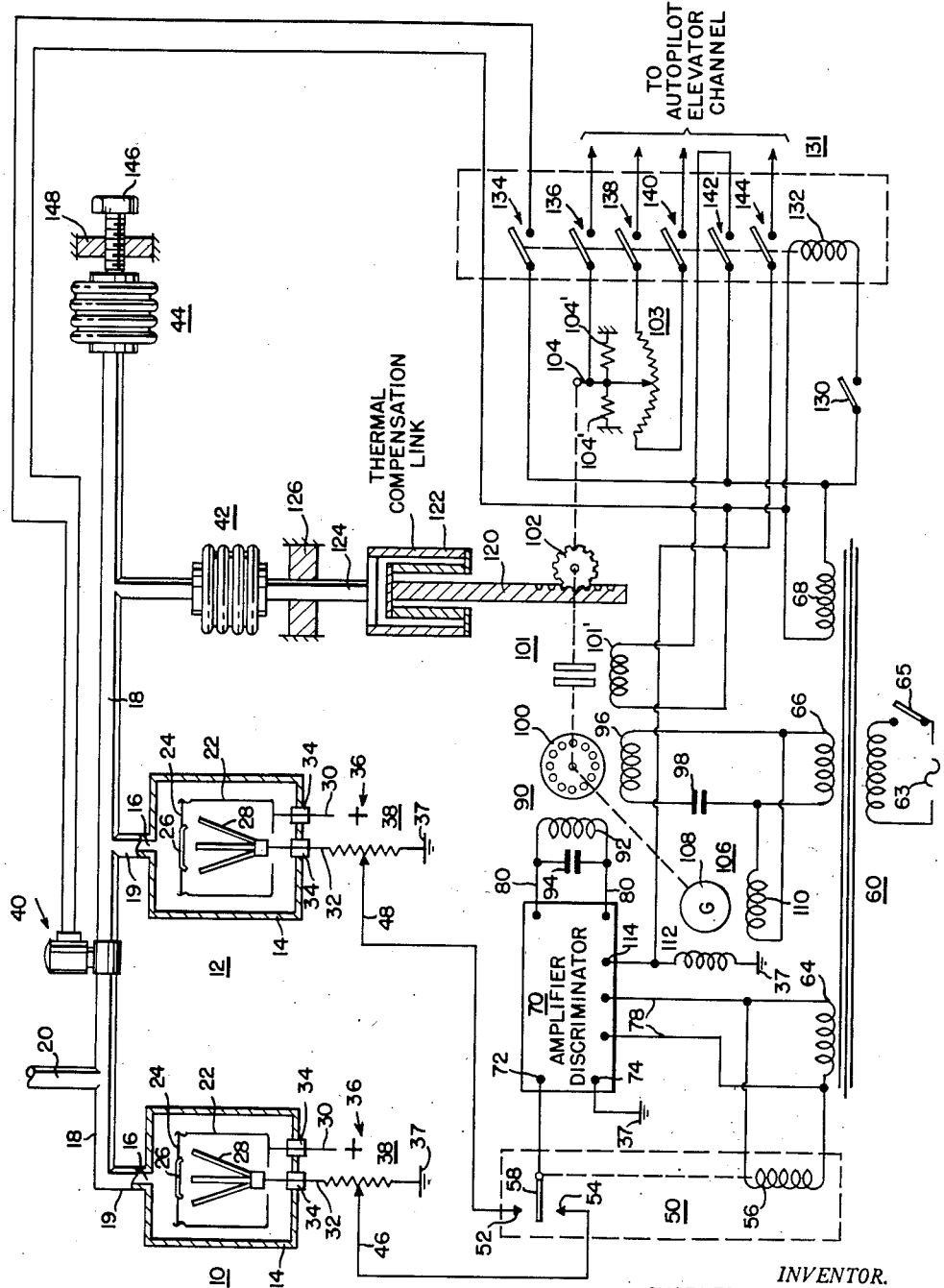
INVENTOR.
CHARLES H. WALDHAUER, JR.
BY
*Leonard B. Koontz*
ATTORNEY

United States Patent Office

2,793,341
Patented May 21, 1957

2,793,341

ALTITUDE CONTROL DEVICES

Charles H. Waldhauer, Jr., St. Paul, Minn., assignor to Minneapolis-Honeywell Regulator Company, Minneapolis, Minn., a corporation of Delaware Application January 10, 1955, Serial No. 480,766

19 Claims. (Cl. 318—489)

My invention pertains to altitude control devices and more specifically to a precision type of altitude controlling apparatus capable of operating from very low to very high altitudes.

Prior art altitude control devices comprising in part a mechanical pressure responsive device such as a bellows or a diaphragm all suffer from several disadvantages one of which is that at extremely high altitudes, there is such a small change in pressure for rather large changes in altitude that the mechanical sensing devices are not sensitive enough to provide accurate control. Another disadvantage of the prior art altitude controllers is that their mechanical sensing elements give false signals in response to accelerational and decelerational forces acting upon the aircraft in which the device is mounted. This in turn causes bumpy and erratic operation of the aircraft.

An object of my invention is to provide an altitude control device which has extreme sensitivity and which has no moving parts in the sensing means. By providing a very sensitive altitude control, the device will perform satisfactorily at altitudes heretofore too high for accurate control by the prior art altitude controllers and the absence of moving parts in the sensing unit renders the device free from all errors suffered by prior art devices due to accelerational effects.

Other more specific objects of the invention will be set forth more fully and become apparent from a reading of the following specification and appended claims, in conjunction with the accompanying drawing in which the single figure shows a preferred embodiment of the invention.

My improved altitude controller comprises a pair of gas pressure responsive tubes having portions thereof normally adapted to be exposed to the atmospheric pressure and whose characteristics are such that the current flow or voltage signal produced therefrom is proportional (either directly or inversely) with the fluid pressure applied to the tubes. An example of this type of tube is the "Alphatron Ionization Chamber" manufactured by the National Research Corporation of Cambridge, Massachusetts. In the discussion below the invention will be described as comprising this type of gas pressure responsive tube but it should be understood that the scope of the invention is intended to cover all electronic devices having a signal output proportional (either directly or inversely) to the pressure of a fluid applied to the device.

Referring to the drawing, numerals 10 and 12 denote a pair of gas pressure responsive tubes which serve as the altitude sensitive means in my controller. Each tube comprises an airtight housing 14 having an aperture 16 therein which provides a means of placing the inside of the housings in communication with the atmospheric static pressure. To this end is provided a hollow conduit 18 having branch sections 19 terminating in apertures 16 and another branch section 20 vented to the atmosphere. Positioned within each one of tubes 10 and 12 by means not shown is a grid collector plate 22 which in turn positions by suitable supporting means 24 a source of radio active material 26. A grid member 28 is positioned within grid collector plate 22 and suitable connection means 30 and 32, insulated from housing 14 as at 34 serve to connect grid collector plate 22 and grid 28 to external circuit means. To this end, a source of positive direct current voltage 36 is applied to connection lead 30 and grid 28 is connected to ground 37 through the resistance element 39 of a potentiometer device 38. Alpha particles emanating from the source of radio active material 26 strike gas molecules within the tubes. This causes the gas molecules to lose an electron during the collision and thereby become positive ions. The positive ions then become attracted to the negatively charged grid and the free electrons flow to the positively charged grid collector plate 22 thus causing a grid or ionization current to flow through the tube, the current obviously becoming greater or lesser as more or less ions collect on the grid in a given time. The factor determining the number of ions collecting on the grid is the pressure within the tube. If the fluid pressure is high, then there will be more gas molecules for the alpha particles to strike thus producing more ions and conversely if the fluid pressure is low, there will be fewer molecules to strike and hence fewer ions to be produced. Thus, at sea level a certain ionization current will flow through the sensing devices 10 and 12 and at higher and higher altitudes the signals will be proportionately less. The "Alphatron Ionization Chamber" is a very sensitive device being able to respond to very low pressures so that when used in the system described herein, it will provide accurate control of aircraft at very high altitudes where low air pressures exist.

Tube 10 serves as a sensing tube and is adapted to be continuously connected to the atmospheric pressure through aperture 16, branch section 19, conduit 18 and branch section 20. Tube 12 serves as a reference unit and normally is in communication with the atmosphere through the aperture 16 thereof, branch section 19, conduit 18 and branch section 20 but is adapted, at a selected altitude, to be sealed off from the atmosphere by an electromagnetically controlled valve 40 positioned in conduit 18 between the branch section 19 connected to reference tube 12 and the branch section 20. Valve 40 is of the normally open type and is adapted upon energization thereof to seal off reference tube 12 from the atmosphere. Also in communication with reference tube 12 through conduit 18 is a mechanically adjustable bellows member 42 and a manually adjustable bellows member 44. The signal outputs from the sensing tube 10 and the reference tube 12 are picked off of potentiometers 38 by wiper members 46 and 48 respectively. Wipers 46 and 48 are positioned so that when both sensing tube 10 and reference tube 12 are exposed to the atmosphere pressure, the signal outputs picked off by the wiper members will be equal to one another. Wipers 46 and 48 are connected respectively to fixed contacts 52 and 54 of a synchronous vibrator 50 having a coil member 56 adapted to be energized from the secondary winding 64 of a transformer member 60, the primary winding 62 of which is adapted to be energized from a suitable source of alternating current 63. A switch 65 interposed in the primary winding circuit provides a master on-off switch. Synchronous vibrator 50 comprises a moving contact 58 which is connected electrically to one of a first pair of input terminals 72 of an amplifier-discriminator 70. The other terminal 72 is connected to ground 37. A second pair of input terminals 78 to amplifier 70 are also connected across secondary winding 64 of transformer 60. Amplifier 70 is not shown in detail since it is not necessary for an understanding of the invention. The function of amplifier 70 is to discriminate between the signals it receives from the pressure responsive tubes 10 and 12 and to develop an alternating current voltage for control purposes to be explained below of a magnitude proportional to the difference in magnitude of the signals from tubes 10 and 12 and of a phase relationship with respect to a reference voltage according to which of tubes 10 and 12 develops the larger signal. Amplifier 70 may well be of the type disclosed in the Jones Patent 2,385,447. A pair of output terminals 80 of amplifier 70 are connected to a first field winding 92 of a two phase motor 90. A condenser 94 in parallel with field winding 92 serves to provide a parallel resonant circuit so that the current flowing therethrough will either be in phase or 180° out of phase with the reference voltage at secondary 64 of transformer 60. Motor 90 also comprises a second field winding 96 connected to a second secondary winding 66 of transformer 60. A condenser 98 is connected in series with winding 96 so as to cause the current in winding 96 to lead the reference voltage by 90°. Motor 90 has a rotor element 100 which is adapted to be mechanically connected through a gear train, not shown, and an electromagnetically operated clutch 101 to a pinion gear 102 and a wiper member 104 of a potentiometer 103. Wiper 104 is adapted to be normally centered with respect to the resistance element of potentiometer 103 by suitable spring means 104'. The rotating member 108 of a velocity signal generator 106 is also driven by motor 90 through a suitable mechanical connection. Generator 106 has a primary winding 110 adapted to be energized by secondary winding 66 of transformer 60 as well as a secondary winding 112 in which is developed a voltage proportional to the speed of rotation of member 108. One side of winding 112 is shown to be connected to ground as at 37 and the other side is shown to be connected to a third input terminal 114 of amplifier 70. Normally, valve 40 will be deenergized so that the pressure in tubes 10 and 12 will be the same and the currents flowing therethrough will be equal to one another. Thus equal signals will be applied to stationary contacts 52 and 54 of the synchronous vibrator 50. When switch 65 is closed, the primary winding 62 of transformer 60 is energized thus energizing coil 56 of synchronous vibrator 50 causing the moving contact 58 to oscillate back and forth between the fixed contacts 52 and 54. As long as equal signals are applied to fixed contacts 52 and 54, the amplifier 70 will have a zero output and hence no voltage will be impressed on field winding 92 of motor 90. However, if the signal from sensing unit 10 exceeds the signal from the reference unit 12, then motor winding 92 will be energized in such a direction so as to cause rotation of the motor in one direction and conversely if the signal from sensing unit 10 is less than the signal from reference unit 12, the motor winding 92 will be energized in the opposite direction so as to cause the motor to rotate in the opposite direction. Further, the speed of rotation of motor 90 will be proportional to the difference in magnitude of the signals from the pressure responsive devices 10 and 12.

Gear 102 is adapted to engage with a rack, worm or similar member 120 which is connected to bellows member 42 through a thermal compensation link 122 and a shaft 124 journalled as at 126. Thus, rotation of motor 90 will cause pinion gear 102 to rotate, displacing rack gear 120 and in turn displacing bellows member 42. Displacement of bellows member 42 while valve 40 is deenergized will have no effect on reference tube 12 in as much as said tube at that time is exposed to the atmosphere. However, when solenoid valve 40 is energized, thus sealing off reference tube 12 from the atmosphere, displacement of bellows member 42 causes the pressure within reference tube 12 to vary accordingly. Thermal link 122 serves the purpose of compensating the system for pressure changes caused by temperature changes. Thermal link 122 is preferably of the type widely used in clock pendulums for temperature compensation.

A third secondary winding 68 on transformer 60 is adapted to be connected through a switch 130 to the winding 132 of a relay 131. Relay 131 has a first normally open set of contacts 134 connected between solenoid valve 40 and secondary winding 68 so that energization of relay 131 will cause power to be applied to solenoid valve 40 and hence seal off reference tube 12 from the atmosphere. Relay 131 also has normally open contacts 136, 138 and 140 which respectively connect the wiper 104 and the two ends of resistance element of potentiometer 103 to the elevator channel of an autopilot which well may be of the type shown in Robert J. Kutzler patent application No. 208,391, filed January 29, 1951. A fifth set of normally open contacts 142 of relay 131 serves as a connection means between secondary winding 68 of transformer 60 and a coil 101' of electromagnetic clutch 101. A sixth set of normally open contacts 144 of relay 131 serves as a connection means between the autopilot elevator channel and the output winding 112 of velocity signal generator 106. This provides a means, if desired, of applying a signal to the autopilot proportional to the rate of change of altitude since the speed of rotation of motor 90 which indirectly generates the signal in winding 112 is a function of altitude rate of change.

Bellows member 44 is adapted to be displaced by a screw means 146 supported by a suitable bracket 148 that provides a means of varying the total volume acted upon by the feedback bellows 42.

*Operation*

When it is not desired to use the altitude control, switch 130 will be kept in the open position as shown in the drawing and switch 65 will be closed thus energizing the amplifier 70 as well as the synchronous vibrator 50. Relay 131 will be deenergized thus deenergizing solenoid valve 40 which will expose the inner portion of reference tube 12 to the atmosphere through conduit 18. As the craft changes altitude, the changes in atmospheric pressure will affect both sensing tube 10 and reference tube 12 in the same manner and no rotation of motor 90 will result. At an altitude which the pilot selects, switch 130 will be closed thus energizing coil 132 of relay 131. This causes contacts 134, 136, 138, 140, 142, and 144 to close and complete the following circuits. The displacement potentiometer 103 is connected to the autopilot elevator channel through contacts 136, 138 and 140 while the autopilot receives a rate of change of altitude signal from velocity signal generator 106 through contact 144. Electromagnetic valve 40 is energized through contact 134 and thus seals off reference tube 12 from the atmosphere. Winding means 101' associated with clutch 101 is energized from secondary 68 of transformer 60 through contacts 142 and allows rotation of motor 90 to be transmitted to pinion gear 102 and displacement potentiometer wiper 104. As long as the aircraft remains at the selected altitude, the signal output from the tubes 10 and 12 will remain the same and motor 90 will not receive any signal from amplifier 70. However, any deviation of the aircraft away from the selected altitude will cause the pressure in sensing tube 10 either to exceed or to be less than the pressure in reference tube 12 depending on whether the aircraft goes below or above the selected altitude. If the aircraft goes below the selected altitude the signal output from sensing tube 10 will exceed that from reference tube 12 and an input signal will be applied on winding 92 of motor 90 thus causing said motor 90 to rotate in a clockwise direction as shown. Generator 106 will provide a rate of change of altitude signal to the autopilot as well as an anti-hunt feedback signal into amplifier 70 and displacement of the wiper member 104 on potentiometer 103 will feed a displacement signal into the autopilot elevator channel thus causing the aircraft to change its attitude so as to regain the selected altitude. At the same time, pinion gear 102 will rotate clockwise as shown causing upward displacement of rack gear 120 as shown so as to decrease the size of bellows member 42. This in turn will increase the pressure in the closed system defined by reference tube 12, bellows 42 and adjustable bellows 44 which in turn will cause the output of reference tube 12 to increase. As this happens, there no longer will be a difference in the signal outputs from reference tube 12 and sensing tube 10 and hence rotation of motor 90 will cease. As the craft starts to regain the selected altitude, the signal from reference tube 12 will exceed that from sensing tube 10 and now the motor 90 will be driven in the opposite direction bringing wiper 104 back towards its original position as well as displacing bellows member 42 in the opposite direction causing the pressure in reference tube 12 to decrease. Thus, as the aircraft attains the selected altitude once again the displacement potentiometer wiper 104 will be at its initial position so that the attitude of the craft will be horizontal and the pressure in reference tube 12 will be the same as the atmospheric pressure in sensing tube 10. It will be understood that if instead of going below the selected altitude, the aircraft goes above the selected altitude the operation of the altitude control apparatus is opposite to that described above to the extent that initially reference tube 12 will conduct more than the sensing tube 10 which will cause motor 90 to rotate counterclockwise as shown and hence decrease the pressure applied to reference tube 12.

The volume of bellows member 44 may be adjusted to vary the sensitivity of the apparatus or could be connected to other means not shown to automatically vary the sensitivity of the altitude control system in accordance to some other variable, for instance airspeed or the like. Variation of the volume of bellows 44 should be done while valve 40 is deenergized and provides a sensitivity control for the system in that feedback pressure to reference tube 12 from pinion 102, rack 120, thermal compensation link 122, bellows 42, etc., is a function of the total volume of air enclosed when valve 40 is energized.

While I have shown and described a specific embodiment of this invention, further modifications and improvements will occur to those skilled in the art and I desire it to be understood, therefore, that this invention is not limited to the particular form shown and I intend in the appended claims to cover all modifications which do not depart from the spirit and scope of this invention.

What I claim is:

1. In an automatic altitude control for an aircraft, a pair of electron valves having portions thereof normally opened to the atmosphere and being characterized by having electronic flow proportional to the magnitude of the pressure of the fluid about said portions, means for normally equalizing the signal output from said valves, means for sealing off one of said valves at a preselected altitude, motor means, pressure means operated by said motor means and adapted to adjust the fluid pressure in said portion of said one of said valves and means responding to a difference in signal output from said valves when said aircraft departs from said preselected altitude for operating said motor means.

2. In an automatic altitude control for an aircraft, a pair of pressure responsive ionization chambers having portions thereof normally opened to the atmosphere and being characterized by having electronic flow proportional to the magnitude of the pressure about said portions, means for sealing off one of said chambers from the atmosphere at a preselected altitude, motor means, pressure rebalance means operated by said motor means and connected to said one of said chambers so as to adjust the fluid pressure in said portion of said one of said chambers, and means responding to a difference in signal output from said chambers for operating said motor means.

3. In an automatic altitude control for an aircraft, a pair of electron valves having portions thereof normally opened to the atmosphere and being characterized by having electronic flow proportional to the magnitude of the pressure of the fluid about said portions, means for normally equalizing the signal output from said valves, means for sealing off one of said valves at a preselected altitude, motor means, pressure means operated by said motor means and adapted to adjust the fluid pressure in said portion of said one of said valves, means responding to a difference in signal output from said valves when said aircraft departs from said preselected altitude for operating said motor means, and means operated by said motor means for causing ascent or descent of said aircraft.

4. In an automatic altitude control for an aircraft, a pair of electron valves having portions thereof normally opened to the atmosphere and being characterized by developing an electrical signal proportional to the magnitude of the pressure about said portions, means for sealing off one of said valves at a preselected altitude, and means responding to a change in the electrical signals of said valves once said one of said valves has been sealed for adjusting the fluid pressure in said portion of said one of said valves.

5. In an automatic altitude control for an aircraft, a pair of pressure responsive electron tubes having portions thereof normally opened to the atmosphere and being characterized by developing an electrical signal proportional to the magnitude of the pressure about said portions, means for sealing off one of said tubes at a preselected altitude, and means responding to a change in the electrical signals of said tubes once said one of said tubes has been sealed for adjusting the fluid pressure in said portion of said one of said tubes so that it is equal to the fluid pressure in said portion of the other of said tubes.

6. In an automatic altitude control for an aircraft, a pair of electron valves having portions thereof normally opened to the atmosphere and being characterized by developing an electrical signal proportional to the magnitude of the pressure about said portions, means for sealing off one of said valves at a preselected altitude, means responding to a change in the electrical signals of said valves once said one of said valves has been sealed for adjusting the fluid pressure in said portion of said one of said valves, and means operated by said responsive means for causing ascent or descent of said aircraft.

7. In an automatic altitude control for an aircraft, a pair of electron valves having portions thereof adapted to be normally exposed to fluid pressure proportional to the atmospheric pressure and characterized by developing electrical signals proportional to the magnitude of said fluid pressure, means sealing off one of said valves at a pressure corresponding to a preselected altitude, motor means controlled by said valves, and means operated by said motor means for adjusting the pressure about the portion of said one of said valves, said motor means being actuated upon a difference in pressure applied to said portions of said valves and causing said pressure adjusting means to equalize the pressure applied to said portions of said valves.

8. In an automatic altitude control for an aircraft, a pair of electron control valves adapted to be normally exposed to fluid pressure proportional to the atmospheric pressure and characterized by developing electrical signals proportional to the magnitude of said fluid pressure, means sealing off one of said valves at a pressure corresponding to a preselected altitude, motor means controlled by said valves, and pressure feedback means operated by said motor means for varying the pressure in said one of said valves, said motor means being actuated upon a difference in pressure applied to said valves and causing said pressure feedback means to equalize the pressure applied to said valves.

9. In an automatic altitude control system for an aircraft, a pair of ionization chambers adapted to be normally exposed to fluid pressure proportional to the atmospheric pressure and characterized by developing electrical signals proportional to the magnitude of said fluid pressure, means sealing off one of said chambers at a pressure corresponding to a preselected altitude, motor means controlled by said signals from said chambers, means operated by said motor means for varying the pressure in said one of said chambers, said motor means being actuated upon a difference in pressure applied to said chambers and causing said pressure varying means to equalize the pressure applied to said chambers, thermal compensation means for rendering said system insensitive to temperature changes, and means operated by said motor means for causing ascent or descent of said aircraft.

10. In an automatic altitude control for an aircraft: a pair of electron valves having portions thereof normally in communication with the atmosphere and characterized by developing an electrical signal proportional to the magnitude of the pressure of the fluid about said portions; an adjustable bellows in communication with one of said valves; means for sealing off said one of said valves from the atmosphere at a selected altitude; motor means; means including said signal producing valves for controlling said motor means, said motor means being unactuated as long as said portions of said valves have equal pressures applied thereto and actuated when said portions have unequal pressures applied thereto; and means connecting said motor means to said adjustable bellows so that operation of said motor means will adjust the pressure applied to the portion of said one of said valves.

11. In an automatic altitude control system for an aircraft: a pair of ionization chambers having portions thereof normally in communication with the atmospheric pressure and characterized by developing an electrical signal proportional to the magnitude of the pressure about said portions; an adjustable bellows in communication with one of said chambers; means for sealing off said one of said chambers and said bellows from the atmosphere at a selected altitude; motor means; means including said signal producing chambers for controlling said motor means, said motor means being unactuated as long as said portions of said chambers have equal pressures applied thereto and actuated when said portions have unequal pressures applied thereto; and means including temperature responsive means connecting said motor means to said adjustable bellows so that operation of said motor means will adjust the pressure applied to the portion of said one of said chambers.

12. In an automatic altitude control for an aircraft: a pair of electron valves having portions thereof normally in communication with the atmospheric pressure and characterized by developing an electrical signal proportional to the magnitude of the pressure of the fluid about said portions; an adjustable bellows in communication with one of said valves; means for sealing off said one of said valves from the atmosphere at a selected altitude; motor means; means including said signal producing valves for controlling said motor means, said motor means being unactuated as long as said portions of said valves have equal pressures applied thereto and actuated when said portions have unequal pressures applied thereto; means including temperature responsive means connecting said motor means to said adjustable bellows so that operation of said motor means will adjust the pressure applied to the portion of said one of said valves, and means for varying the volume of fluid acted upon by said bellows.

13. Automatic altitude control apparatus for a dirigible craft disposed in a fluid comprising: a pair of electron valves characterized by having portions thereof adapted to be exposed to fluid pressure and by developing electrical signals as a function of the magnitude of the fluid pressure to which said portions are exposed, one of said valves being a sensing unit and having its exposed portion continuously in contact with the fluid in which said craft is disposed, and the other of said valves being a reference unit and having its exposed portion in contact with the fluid in which said craft is disposed at a preselected altitude; motor means operated by a difference in electrical signals of said valves, and means operated by said motor means for equalizing said electrical signals.

14. Automatic altitude control apparatus for a dirigible craft disposed in a fluid comprising: a pair of electron valves characterized by having portions thereof adapted to be exposed to fluid pressure and by developing electrical signals as a function of the magnitude of the fluid pressure to which said portions are exposed, one of said valves being a sensing unit and having its exposed portion continuously in contact with the fluid in which said craft is disposed, and the other of said valves being a reference unit and having its exposed portion in contact with the fluid in which said craft is disposed at a preselected altitude motor means operated by a difference in electrical signals of said valves, means operated by said motor means for equalizing said electrical signals, and means operated by said motor means for causing ascent or descent of said craft.

15. Automatic altitude control apparatus for a dirigible craft disposed in a fluid comprising: a pair of electron valves characterized by having portions thereof adapted to be exposed to fluid pressure and by developing electrical signals as a function of the magnitude of the fluid pressure to which said portions are exposed, one of said valves being a sensing unit and having its exposed portion continuously in contact with the fluid in which said craft is disposed, and the other of said valves being a reference unit and having its exposed portion in contact with the fluid in which said craft is disposed at a preselected altitude; means operated by a difference in electrical signals of said valves for equalizing said electrical signals by adjusting the pressure applied to said reference valve.

16. In pressure sensing apparatus, a pair of electron valves having portions thereof normally opened to the atmosphere and being characterized by having electronic flow indicative of the magnitude of the pressure of the fluid about said portions, means for normally equalizing the signal output from said valves, means for sealing off one of said valves at a preselected pressure, motor means, pressure means operated by said motor means and adapted to adjust the fluid pressure in said portion of said one of said valves, and means responding to a difference in signal output from said valves for operating said motor means.

17. In pressure sensing apparatus, a pair of electron valves having portions thereof normally exposed to pressures proportional to an ambient pressure and being characterized by developing electrical signals indicative of the magnitude of said ambient pressures, means for sealing off one of said valves at a selected ambient pressure, and means responding to a change in the electrical signals of said valves once said one of said valves has been sealed off, said responsive means adjusting the pressure in said portion of said one of said valves.

18. In pressure sensing apparatus, a pair of electron control valves adapted to be normally exposed to fluid pressure proportional to the ambient pressure and characterized by developing electrical signals indicative of the magnitude of said fluid pressure, means sealing off one of said valves at a pressure corresponding to a selected ambient pressure, motor means controlled by said valves, and pressure feedback means operated by said motor means for varying the pressure in said one of said valves, said motor means being actuated upon a difference in pressure applied to said valves and causing said pressure feedback means to equalize the pressure applied to said valves.

19. In pressure sensing apparatus, a pair of ionization chambers having portions normally in communication with the atmospheric pressure and characterized by developing an electrical signal proportional to the magnitude of the pressure about said portions; an adjustable bellows in communication with one of said chambers; means for sealing off said one of said chambers from the atmosphere at a selected atmospheric pressure; motor means; means including said signal producing chambers for controlling said motor means; said motor means being unactuated as long as said portions of said chambers have equal pressures applied thereto and actuated when said portions have unequal pressures applied thereto; means including temperature responsive means connecting said motor means to said adjustable bellows so that operation of said motor means will adjust the pressure applied to the portion of said one of said chambers, and means for varying the volume of fluid acted upon by said bellows.

References Cited in the file of this patent

UNITED STATES PATENTS

| | | |
|---|---|---|
| 2,528,575 | Broadbent | Nov. 7, 1950 |
| 2,593,014 | Divoll | Apr. 15, 1952 |
| 2,625,586 | Lander | Jan. 13, 1953 |